Dec. 13, 1960 S. C. HERBINE ET AL 2,963,708
WELDING SHIELD HEADGEAR ADJUSTMENT
Filed Oct. 16, 1958
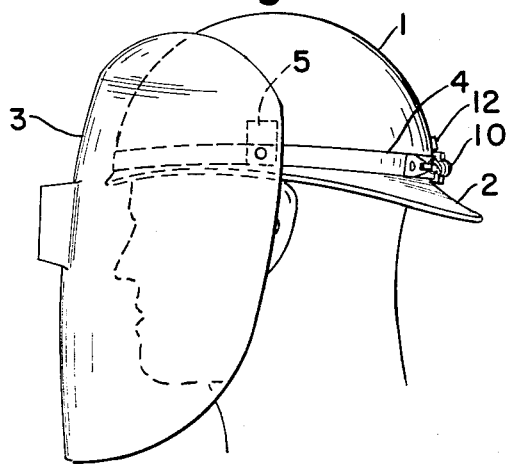
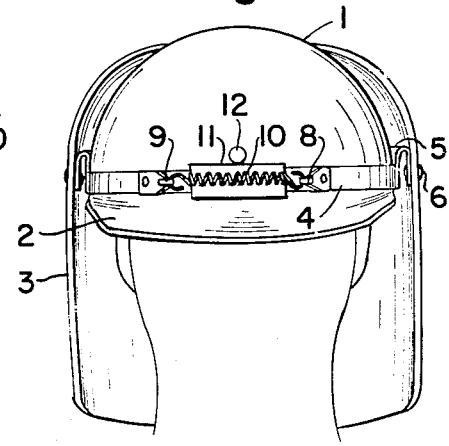
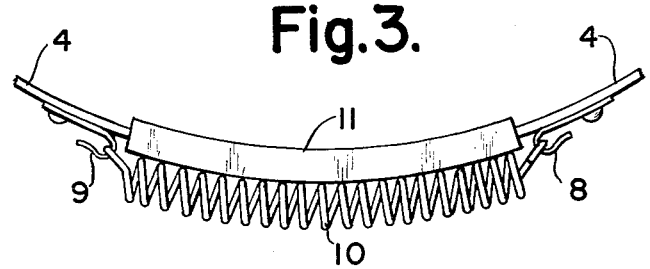
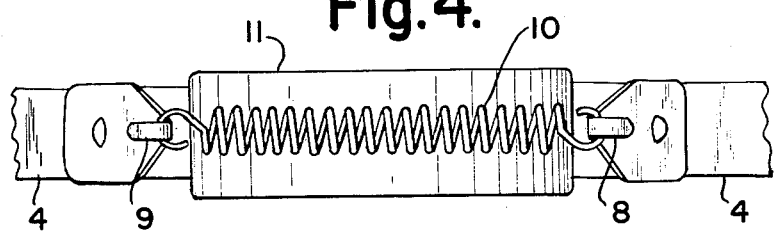
INVENTORS.
Stanley C. Herbine
William H. Bohner
BY
*William J. Ruano*
attorney.

2,963,708

WELDING SHIELD HEADGEAR ADJUSTMENT

Stanley C. Herbine and William R. Bohner, Reading, Pa., assignors to The Electric Storage Battery Company, Philadelphia, Pa.

Filed Oct. 16, 1958, Ser. No. 767,674

2 Claims. (Cl. 2—8)

This invention relates to a detachable welding shield (or face shield) and safety cap combination and, more particularly, to a detachable connection therebetween which enables the welder, by the use of only one hand, to either attach the welding shield or to detach it from the safety cap so that he may use his other hand for holding a welding electrode holder or other equipment.

The combination of a welding shield and safety cap is known in the art, however, one outstanding disadvantage of such combination as conventionally used has been that the welding shield is fastened to the helmet by fastening means, such as screws and the like, which involves a certain amount of difficulty and the use of both hands for either attaching the welding shield to the safety cap or detaching it therefrom, as well as requiring appreciable time for such connection or disconnection. This is undesirable because the welder usually has an electrode holder or other equipment in one hand and has frequent necessity of removing the shield or attaching it to the safety cap during intermittent welding operations. Therefore, in the conventional combination it would be necessary for him to lay down the welding torch and then use both hands for applying the screws or other fastening elements for attaching the welding shield to the helmet. Because of this inconvenience, many times the shield is not worn when it should be, therefore exposing the workman to danger.

An object of the present invention is to provide a novel welding shield and safety helmet interconnection, which shield can be tilted in a conventional manner and whereby the welding shield may be easily and quickly attached to or detached from the safety cap or helmet by means of only one hand, gloved or ungloved, of the welder.

A more specific object of the invention is to provide a spring connection between the welding shield and the headband portion of the safety cap or helmet, whereby the shield may be attached to the cap merely by spring pressure and without the necessity of fastening screws, studs, lugs or other similar fastening devices.

Other objects and advantages of the present invention will become apparent from a study of the following description taken with the accompanying drawing wherein:

Fig. 1 is a side, elevational view showing a safety cap and welding shield combination embodying the readily attachable and detachable connecting means in accordance with the principles of the present invention.

Fig. 2 is a rear view of the combination shown in Fig. 1.

Fig. 3 is an enlarged, fragmentary, top view showing the rear portion of the spring connection between the safety cap and shield; and Fig. 4 is an enlarged rear view of the connection shown in Fig. 3.

Referring more particularly to the drawing, numeral 1 denotes a safety cap or hat of any well-known type, such as a plastic or metal cap or hat, and numeral 2 denotes a brim portion.

A welding shield 3 of any conventional type is shown including the well-known window portion through which the welder is able to view objects as they are welded. The shield 3 is attached, by means of a pair of leaf springs 5 of inverted, substantially U-shape, to diametrically opposite portions of a headband 4 of plastic material. One leg of each spring 5 is secured, by means of a pivot 6, to the shield, such pivot means 6 including a conventional bolt and a "speed nut" type of leaf spring washer so as to enable adjustment of the tension of the spring washer to enable holding the shield 3 at pre-selected angles of tilt with respect to cap 1. The opposite legs of leaf springs 5 are connected to diagonally opposite portions of the headband 4.

In accordance with the present invention, the end portion of the plastic headband 4 are abutting and are enclosed within a tubular element 11, or one of substantially U-shaped cross section, the purpose of which element is not only to surround the abutting ends of headband 4, but to serve as a back rest for a helical spring 10 whose ends are connected to hooks 8 and 9 which are fastened to the respective end portions of the band 4. One end portion of element 10 is connected to the corresponding end portion of the headband.

Helical spring 10 is always under tension, therefore yieldingly urges the end portions of the bands in contracting relationship so that the band 4 tightly embraces the safety cap 1. Stud 12 limits upward movement of element 11.

In operation, since the headband 4 is held against the band portion of the cap 1 merely by the tension of spring 10, whenever it is necessary to remove the welding shield 3, the welder merely grasps the shield with one hand and lifts it, and in so doing the headband 4 is easily removed from engagemement with the safety cap. Then when the welder desires to again replace the welding shield or to attach it to the cap, he simply grasps the shield with one hand and lowers the headband on the crown portion of the cap, forcing the headband 4 downwardly into its proper position, that is, surrounding the band portion of the cap, so as to tightly grasp such portion and hold the shield in place. the brim portion 2 serves as a limit stop for lowering movements of the headband 4. It will be particularly noted that there are no screws or other fastening means that require the use of two hands for making a connection between the headband 4 and the cap, and, instead, the connection is merely a spring under tension which may be either made or broken by the use of one hand of the welder so as to enable the welder's other hand to be free to hold a welding torch or other equipment.

Thus it will be seen that we have provided an efficient safety shield and safety cap combination which allows the shield to be easily and quickly attached to the cap or detached therefrom by the simple lifting and lowering movement by one hand of the welder; furthermore, we have provided a yieldable spring connection for clamping a headband attachment of the welding shield to the band portion of the cap, whereby the welder may very rapidly and easily attach the shield to the cap when he wants to weld, and detach it therefrom when the welding operation is completed, therefore greatly speeding up production and encouraging wearing of the welding shield at all times when safety precautions demand it.

While we have illustrated and described a single specific embodiment of our invention, it will be understood that this is by way of illustration only, and that various changes and modifications may be made within the contemplation of our invention and within the scope of the following claims.

We claim:

1. In combination with a safety cap having a band portion and an adjoining brim portion, a headband, a welding shield having a pair of spring clips of inverted U-shape attached to opposite sides of the inner surface of said shield and to opposite side portions of the headband, said headband being formed from a discontinuous strap having end portions in confronting relationship, a sleeve surrounding said headband end portions, a spring attached to said headband at points between said end portions and said spring clips, said spring resting against the outer portion of said sleeve for holding the end portions in contiguous relationship on the band portion of the cap and constituting the sole means for attachment to and for limiting expansion of said headband within the limits of said sleeve, whereby the headband is clamped onto the cap solely by said headband under the tension of said spring and so that the welder may, by the use of only one hand, attach or detatch the headband and welding shield with respect to said safety cap, said brim portion serving as a stop to limit downward movement of said headband.

2. The combination recited in claim 1 together with stop means projecting outwardly of said cap immediately above said band portion for limiting upward movement of said sleeve.

References Cited in the file of this patent

UNITED STATES PATENTS

| | | |
|---|---|---|
| 1,841,054 | Powers | Jan. 12, 1932 |
| 2,111,746 | Bowers | Mar. 22, 1938 |
| 2,759,188 | Maillart | Aug. 21, 1956 |

FOREIGN PATENTS

| | | |
|---|---|---|
| 386,350 | Great Britain | Jan. 19, 1933 |